United States Patent [19]

Ishiguro et al.

[11] Patent Number: 4,919,451

[45] Date of Patent: Apr. 24, 1990

[54] AUTOMATIC SEAT BELT DEVICE

[75] Inventors: Kazuyoshi Ishiguro; Tatsuo Yamashita; Kenji Matsui, all of Aichi, Japan

[73] Assignee: Kabushiki Kaisha Tokai-Rika-Denki-Seisakusho, Niwa, Japan

[21] Appl. No.: 227,232

[22] Filed: Aug. 2, 1988

[30] Foreign Application Priority Data

Aug. 5, 1987 [JP] Japan .................. 62-120233

[51] Int. Cl.$^5$ ............................. B60R 22/06
[52] U.S. Cl. .................................... 280/804
[58] Field of Search ........................... 280/804

[56] References Cited

U.S. PATENT DOCUMENTS

| 4,324,419 | 4/1982 | Ueda | 280/804 |
| 4,573,709 | 3/1986 | Kawai et al. | 280/804 |
| 4,597,607 | 7/1986 | Forkel | 297/468 |
| 4,647,070 | 3/1987 | Yamamoto et al. | 280/804 |

FOREIGN PATENT DOCUMENTS

| 60-147558 | 10/1985 | Japan . |
| 60-163162 | 10/1985 | Japan . |
| 61-58149 | 4/1986 | Japan . |
| 61-46354 | 10/1986 | Japan . |
| 61-49133 | 10/1986 | Japan . |
| 60-71354 | 10/1986 | Japan . |
| 63-34754 | 3/1988 | Japan . |
| 63-34755 | 3/1988 | Japan . |

Primary Examiner—David M. Mitchell
Assistant Examiner—Eric Culbreth
Attorney, Agent, or Firm—Sixbey, Friedman, Leedom & Ferguson

[57] ABSTRACT

An automatic seat belt device having a guide rail arranged in a room of a vehicle in a longitudinal direction thereof, a slider engaged with one end of a webbing and supported by the guide rail such as to be movable along the guide rail in forward and rearward directions of the vehicle, and an elongate member engaged at its one end with the slider and moved by a driving force so as to move the slider in the direction. The elongate member is movable so as to move the slider to a rear end portion of its movement so that the webbing may be fastened around a body of an occupant on a vehicle seat when he gets on the vehicle. The automatic seat belt device is equipped with a slider stopping mechanism provided at the end portion of movement when operated, a slider lock mechanism adapted to retain the slider in the stopping condition when operated, and a control member supported by the elongate member and adapted to operate the slider stopping mechanism and the slider lock mechanism when the slider has reached its end portion of movement.

This construction enables the operation of the slider stopping mechanism and the slider lock mechanism to be controlled solely by the control member.

30 Claims, 10 Drawing Sheets

AUTOMATIC SEAT BELT DEVICE

BACKGROUND OF THE INVENTION

The present invention is directed to an automatic seat belt device which enables a webbing to be automatically fastened around a body of an occupant on a vehicle seat with a driving means.

An automatic seat belt device of this type which is being generally used employs a guide rail attached to inner vehicle wall along a door opening. A slider is slidably supported by the guide rail. An outer end portion of the webbing is connected with this slider, the webbing being moved by driving the slider through the intermediary of an elongate member.

In the automatic seat belt device having the above-described construction, the slider stopping mechanism is provided at an end of the slider movement where the webbing is fastened around the body of the occupant on the vehicle seat. This stopping mechanism serves to stop the slider movement by stopping the operation of the driving means.

Japanese patent publication No. 46354/1986 discloses a slider stopping mechanism which includes an actuator operated by the slider and a switch actuated by the operation of this actuator. The actuator is operated when the slider reaches an end of its movement, thereby stopping the operation of the driving means.

It is further known with respect to an automatic seat belt device having the above-described construction that a slider lock mechanism adapted to keep the slider locked can be provided at an end of the slider movement where a webbing is fastened to a body of the occupant on the vehicle seat.

In an automatic seat belt device having both the slider lock mechanism and the slider stopping mechanism, it is rather difficult to find an appropriate space distribution for these two mechanisms. If a relatively long actuator is employed so as to evade the slider lock mechanism, the entire housing section for both the mechanisms becomes rather long. If, on the other hand, a relatively short actuator is employed so that the length of the entire housing section may be shorter, the switch protrudes into the vehicle inner space, a width of the housing section becoming rather large.

SUMMARY OF THE INVENTION

It is accordingly an object of the present invention to provide an automatic seat belt device wherein a slider stopping mechanism and a slider lock mechanism can be arranged in a compact fashion.

In accordance with this invention, there is provided the automatic seat belt device for automatically fastening a webbing around a body of an occupant on a vehicle seat, comprising:

a slider to which one end of the webbing is connected;

a guide rail adapted to slidably support the slider so as to guide the movement thereof in the longitudinal direction with respect to the vehicle inner space;

a driving means adapted to drive the slider by means of an elongate member;

a slider stopping mechanism adapted to be operated at the end of its movement which is on the rear side of the vehicle inner space and in which the webbing is fastened around the body of the occupant so as to stop the operation of the driving means;

a slider lock mechanism adapted to be operated at the end of its movement which is on the rear side of the vehicle inner space, so as to keep the slider in the stop position; and a control member supported by the elongate member and adapted to move with it so as to control the operation of the slider stopping mechanism and said slider lock mechanism.

The above-described construction of the present invention enables the slider lock mechanism and the slider stopping mechanism to be arranged in a compact fashion since the control member serves to control the operation of both mechanisms.

DETAILED DESCRIPTION OF A PREFERRED EMBODIMENT

Figure 1:
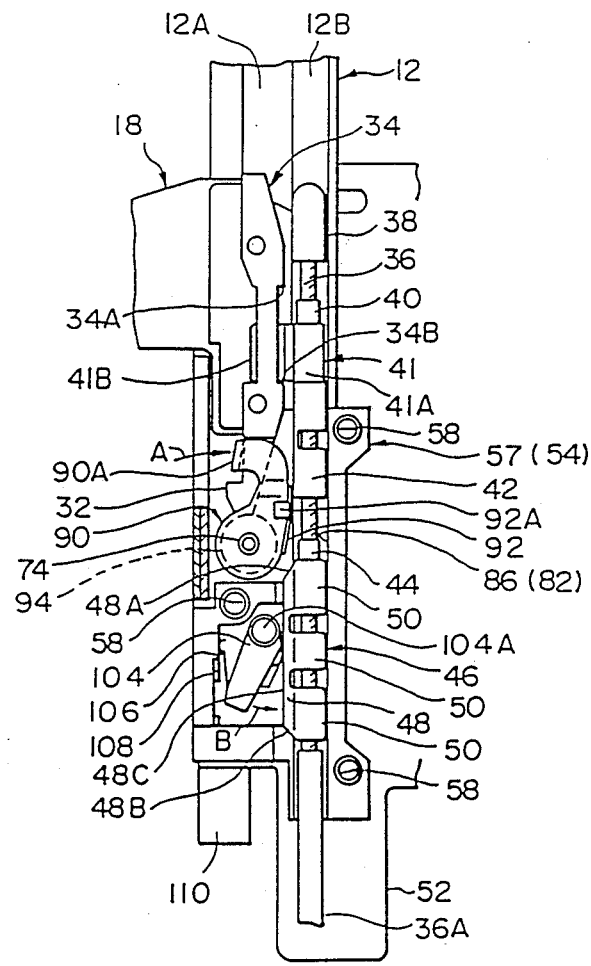
FIG. 1 is a sectional view showing essential parts of an automatic seat belt device in accordance with this invention.
Figure 2:
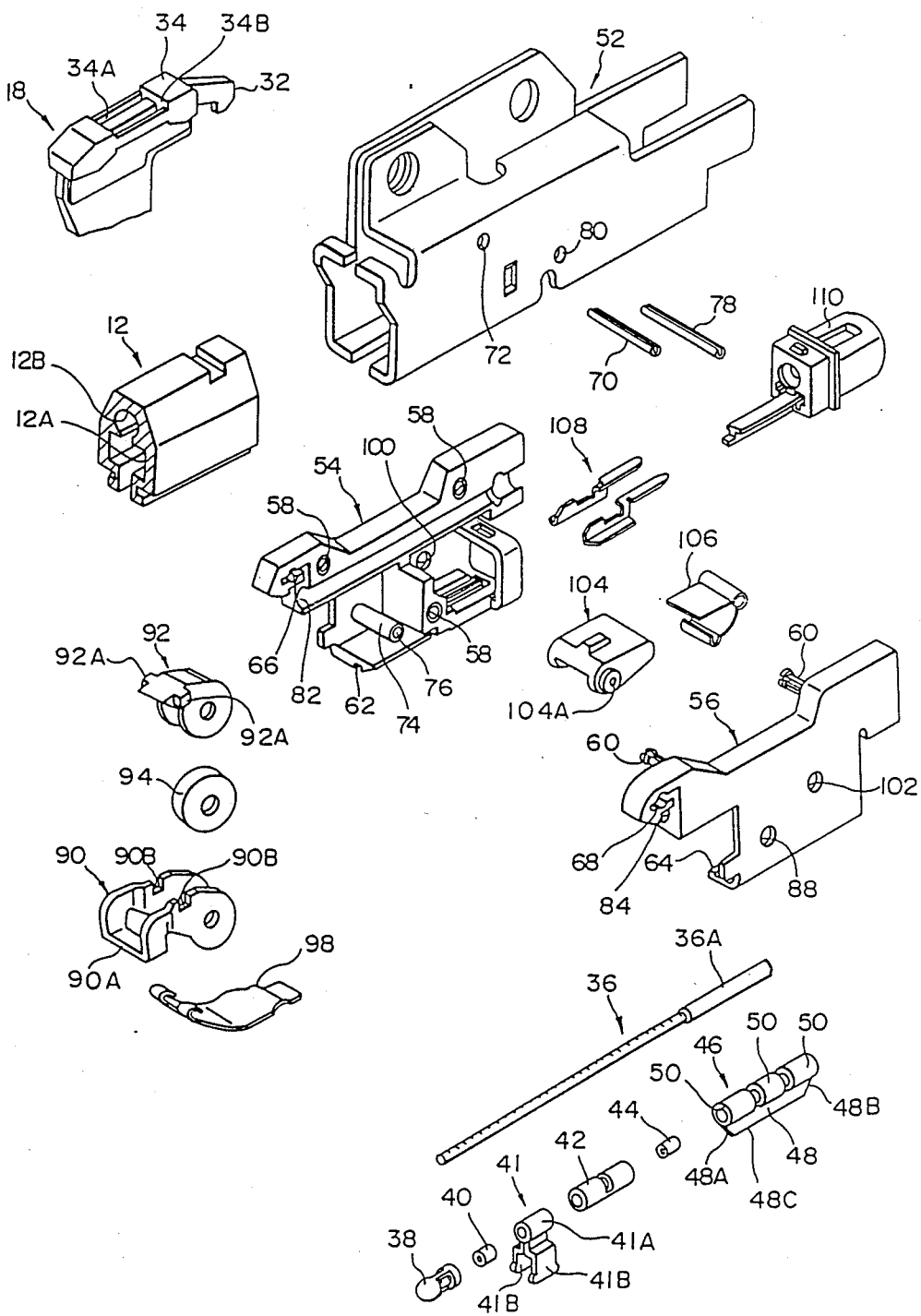
FIG. 2 is an exploded perspective view of the device shown in FIG. 1.
Figure 3:
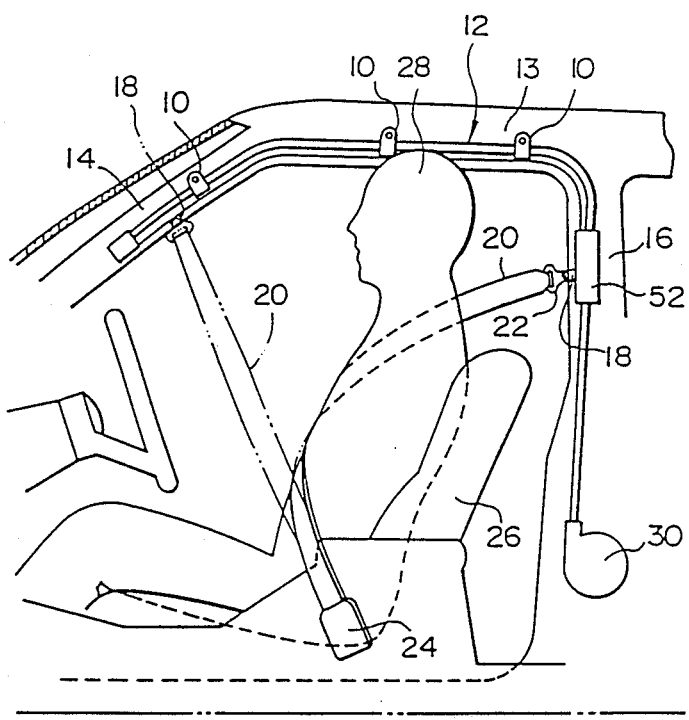
FIG. 3 is a schematic view of an entire automatic seat belt device in accordance with an embodiment of the present invention.

FIGS. 1 to 3 show a preferred embodiment of an automatic seat belt device in accordance with the present invention.

As shown in FIG. 3, a guide rail 12 is mounted on a side portion of a room of a vehicle by means of retainers 10. A middle section of the guide rail 12 is arranged along a roof side rail 13 situated in an upper side section of the room. A front side section of the guide rail 12 is arranged along a front pillar 14, bent at an obtuse angle with respect to the middle section. A rear side section of the guide rail 12 is arranged along a center pillar 16, bent approximately at a right angle with respect to the middle section. A slider 18 is fitted into this guide rail 12 in such a manner as to be able to slide therein in the longitudinal direction. The outer end of a webbing 20 for restraining movement of an occupant 28 of a vehicle seat occupant is engaged with the slider 18 through the intermediary of an anchoring fixture 22.

An inner end section of the webbing 20 is accommodated in a winder 24 which is attached to the vehicle body in the middle section thereof as seen in the lateral direction. The inner end section of the webbing, wound up in layers on the winder 24 by a resilient force, can normally be pulled out of the winder 24 against the resilient force. The winder 24 includes a built-in inertia lock mechanism adapted to instantaneously restrain the pulling-out of the webbing 20 whenever it detects any rapid deceleration of the vehicle by means of an acceleration sensor.

The webbing 20 is fastened around the body of the occupant 28 seated on a seat 26 when the slider 18 is in the rear side end position, as indicated by the solid line, and is released therefrom when the slider 18 is in the front side end position, as indicated by the two-dot chain line. The movement of the slider 18 is effected by means of a driving device 30.

As shown in FIGS. 1 and 2, the slider 18 is composed of a thick steel plate having a hook 32 and capped with a head 34 formed from a relatively soft plastic with a small coefficient of surface friction. The head 34 of the slider 18 is slidably engaged with a section 12A of a rectangular configuration in a cross-section of the guide rail 12. The anchoring fixture 22 is pivoted to the section of the slider 18 which extends through the opening of the guide rail 12, outwardly protruding therefrom.

The slider 18 is moved by a wire cable 36 which moves through a portion 12B of the guide rail 12 which is of a round configuration in cross-section and is driven by the driving device 30. The wire cable 36 is covered with an outer covering 36A except for the front end section thereof. Provided in the front end section of the wire cable 36 are a first fixed piece 38, a second fixed piece 40, a slide piece 41, a movable piece 42, a third fixed piece 44, and a release piece 46 serving as a control member, arranged in this order from the front end.

The slide piece 41, formed by bending a steel plate, includes a cylindrical section 41A which is slidably engaged with the wire cable 36. The cylindrical section 41A is also slidably engaged with the round section 12B of the guide rail 12. This slide piece 41 further includes a pair of legs 41B situated on either side of the slider 18 with respect to the thickness direction thereof. These legs serve to press against a front wall 34A or a rear wall 34B formed in the head 34 of the slider 18, thereby moving the slider 18 toward the front or inner side of the room of the vehicle. The slide piece 41 does not allow the slider 18 to be moved until the legs 41B thereof contact against either the front wall 34A or the rear wall 34B of the head 34.

The first fixed piece 38 is a cylindrical body of a relatively soft plastic with a small coefficient of surface friction. This first fixed piece 38, having a rounded front end section, is fixed to the front end of the wire cable 36 and is slidably engaged with the round section 12B of the guide rail 12.

The second fixed piece 40 is comprised by a cylindrical steel body which is fixed to the wire cable 36 by caulking. This second fixed piece 40 abuts against the cylindrical section 41A of the slide piece 41, thereby restricting the movement of the slide piece 41.

The movable piece 42 is a cylindrical body made of a relatively soft plastic with a small coefficient of surface friction. It is slidably engaged with the wire cable 36 and is also slidably engaged with the round section 12B of the guide rail 12. The movable piece 42 has a notch in the middle section thereof, enabling it to bend in the bent sections of the guide rail 12.

The third fixed piece 44 is composed, as is the second fixed piece 40, of a cylindrical steel body which is fixed to the wire cable by caulking. It abuts against the release piece 46, thereby restricting the movement of the release piece 46. At the same time, it restricts the movement of the slide piece 41 through the intermediary of the movable piece 42.

The release piece 46 is made of a relatively soft plastic with a small coefficient of surface friction. It is composed of a trapezoid base section 48 and three cylindrical sections 50 arranged at intervals on the base of the trapezoid section 48. The cylindrical sections 50 of the release piece 46 are slidably engaged with the wire cable 36 and are capable of bending with respect to the base section 48, in the bent sections of the guide rail 12.

The base section 48 includes a inclined surface 48A facing the front side of the vehicle inner space, an inclined surface 48B facing the rear side of the room of the vehicle and a horizontal surface 48C connecting these inclined surfaces. These surfaces 48A, 48B and 48C serve to control the operation of the slider lock mechanism and the slider stopping mechanism.

An anchor reinforcement 52 is connected to the end section of the guide rail 12 on the rear side of the vehicle inner space. The anchor reinforcement 52 is made from a thick steel plate which is bent to form a box-like configuration and is attached to the center pillar 16, as shown in FIG. 3. The part of the anchor reinforcement 52 which is engaged with the guide rail 12 has an opening formed at the position corresponding to the opening of the guide rail 12.

A housing 57 composed of first and second housings 54, 56 is provided inside the anchor reinforcement 52. The first and second housings 54 and 56 are made of a relatively hard plastic and are electrically non-conductive. The first housing 54 includes three through holes 58 with which three projections 60 which are formed in the second housing 56 are engaged, though only two projections are shown in the drawings. Further, a groove 62 formed in the first housing 54 is engaged with a projection 64 formed in the second housing 56, thus defining a hollow section within.

The housing 57 is fixed to the anchor reinforcement 52 by means of slotted pins 70 and 78. An intermediate section of the slotted pin 70 is engaged with holes 66 and 68 formed in the first and second housings 54 and 56, respectively, and the end sections of the slotted pin 70 are engaged with through holes 72 formed in the anchor reinforcement 52. The intermediate section of the slotted pin 78 is engaged with a through hole 76 formed in a shaft 74 protruding from the side wall of the first housing 54, and the end sections of the slotted pin 78 are engaged with through holes 80 formed in the anchor reinforcement 52.

Recesses 82 and 84 with an approximately semi-circular cross-section formed in the first and second housings 54 and 56, respectively, form, when put together, a guide hole 86 communicating with the circular-cross-sectioned part 12B of the guide rail 12. The wire cable 36 is inserted into the guide hole 86. Further, the guide hole 86 communicates with the hollow section defined within the housing 57. Installed inside the hollow section of the housing 57 are the slider lock mechanism and the slider stopping mechanism which are controlled by the release piece 46.

The front end section of the shaft 74 projected from the side wall of the first housing 54 is supported by a through hole 88 formed in the second housing 56. A lock plate 90 is rotatably engaged with the shaft 74. Inside the lock plate 90, a lock plate actuator 92 is rotatably engaged therewith. Further, inside the lock plate actuator 92, a cylindrical rubber damper 94 is engaged therewith.

The lock plate 90 is formed by bending a thick steel plate. The front sections of side walls of this lock plate 90 is formed as hooks. A section 90A which is linking these front sections together can be engaged with the hook 32 of the slider 18. The lock plate actuator 92 is formed of a relatively hard plastic. Projections 92A of the lock plate actuator 92 are fitted into recesses 90B formed in the lock plate 90. Thus, the lock plate actuator 92 is rendered integral with the lock plate 90, forming the top wall thereof. The release piece 46 can be engaged with the lock plate actuator 92, and the hook 32 of the slider 18 can abut against the rubber 94.

The lock plate 90 is urged in the direction indicated by an arrow head A in FIG. 1 by a return spring 98 in the form of a leaf spring one end of which is engaged with the housing 57. It is locked by the hook 32 of the slider 18 at the rotation end in the direction indicated by the arrow head A and abutting against the inner wall of the housing 57 shown in FIG. 1. Further, when the lock plate actuator 92 is pressed by the horizontal surface 48C of the release piece 46, the lock plate 90 is not locked by the hook 32 of the slider 18 since in that condition it is rotated in the direction reverse to that indicated by the arrow head A, against the resilient force of the return spring 98.

A switching actuator 104 made of a relatively hard plastic is pivoted with axis portions 104A formed on either side thereof to the housing 57 by means of through holes 100 and 102 formed in the first and second housings 54 and 56, respectively. Attached to the switching actuator 104 is the intermediate section of a contact 106 which is a movable contact. The contact 106 composes a switch provided in the electric circuit for opening and closing the power source circuit of the driving device 30. It is composed of a resilient metal plate which is a good conductor of electricity. One end section of the contact 106 is positioned along the switching actuator 104, and the other end section thereof can abut against a stationary terminal 108.

The terminal 108 is composed of a pair of metal plates which are good conductors, and composes the above-mentioned switch together with the contact 106. It is fixed to and supported by a housing 110 fixed to the housing 57. Connected to the pair of metal plates composing the terminal 108 are respective lead wires (not shown) which are connected to the electric circuit for controlling the power source circuit of the driving device 30. Because of this arrangement, the circuit is opened when the contact 106 abuts against the terminal 108, and closed when the contact 106 is separated from the terminal 108.

As shown in FIG. 1, the contact 106 is separated from the terminal 108 while the switching actuator 104 is being forced by the horizontal surface 48C of the release piece 46. When the horizontal surface 48C of the release piece 46 is separated from the switching actuator 104, the contact 106 urges, by its own resilience, the switching actuator 104 and rotates it in the direction indicated by an arrow head B in FIG. 1, causing it to abut against the inner wall of the housing 57. The contact 106 itself is then pressed against the terminal 108.

The operation of this embodiment of the present invention will now be described.

When the occupant 28 on the vehicle seat gets on the vehicle, the slider 18 is positioned at that end of its movement along the guide rail 12 which is situated on the front side of the vehicle inner space, so that he can seat himself on the seat 26 without being hindered by the webbing 20. When the occupant 28 closes a door of the vehicle, the switch (not shown) of an electric circuit which is connected to the power source circuit for the driving device 30 is closed. This causes the driving device 30 to be driven, moving the wire cable 36 toward the rear side of the vehicle inner space. At this stage, the contact 106 is abutting against the terminal 108, closing the electric circuit. The movement of the wire cable 36 causes the second fixed piece 40 fixed to the wire cable 36 to pressurize the slide piece 41, which applies pressure to the rear wall 34B of the head 34, thereby causing the slider 18 to be moved toward the rear side of the vehicle inner space. In this condition, the release piece 46 abuts against the third fixed piece 44.

Figure 4:
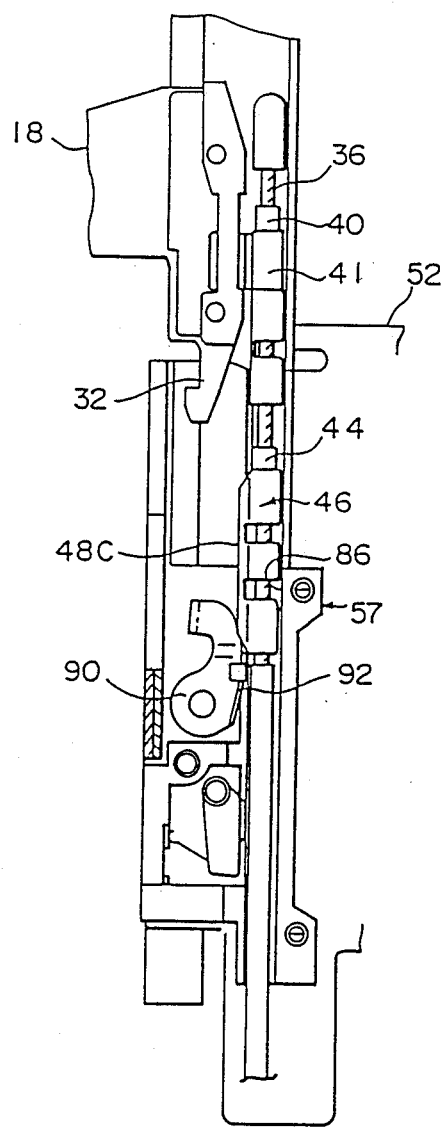
FIGS. 4 to 6 are sectional views corresponding to FIG. 1 and illustrating each condition of operations to fasten a webbing a body of an occupant on a vehicle seat.

As shown in FIG. 4, the release piece 46 has already started to enter the guide hole 86 of the housing 57 when the hook 32 of the slider 18 begins to enter the section where it is engaged with the anchor reinforcement 52. In the condition shown in FIG. 4, the inclined surface 48B of the release piece 46 has started to abut against the lock plate actuator 92.

Figure 5:
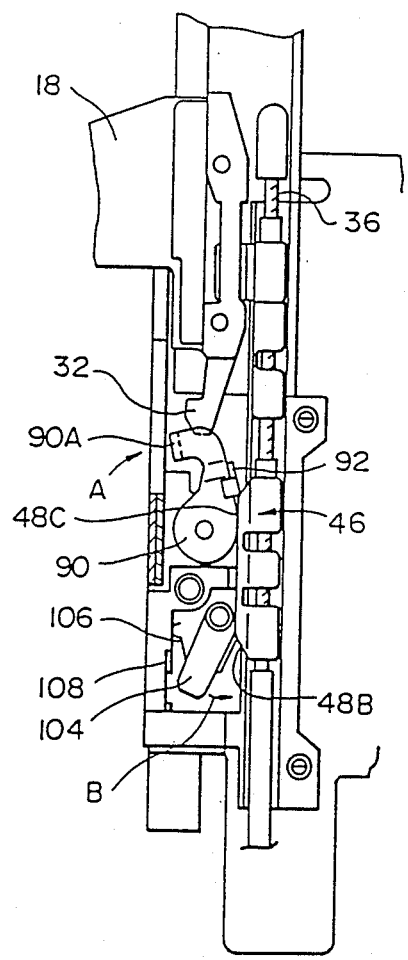

When the slider 18 has further moved, as shown in FIG. 5, the horizontal surface 48 of the release piece 46 is pressed against the lock plate actuator 92, causing the lock plate to rotate in the anti-A direction, against the resilient force of the return spring 98. This causes the lock plate 90 to move to the position where the connecting section 90A does not abut against the hook 32 of the slider 18. At the same time, the inclined surface 48B of the release piece 46 causes the switching actuator 104 to be rotated in the anti-B direction, against the resilient force of the contact 106. This causes the contact 106 to be separated from the terminal 108, opening the electric circuit and the power source circuit of the driving device 30. This stops the operation of the driving device 30, but due to inertia the driving device does not stop immediately, so that the wire cable 36 moves further, thereby moving the slider 18.

Figure 6:
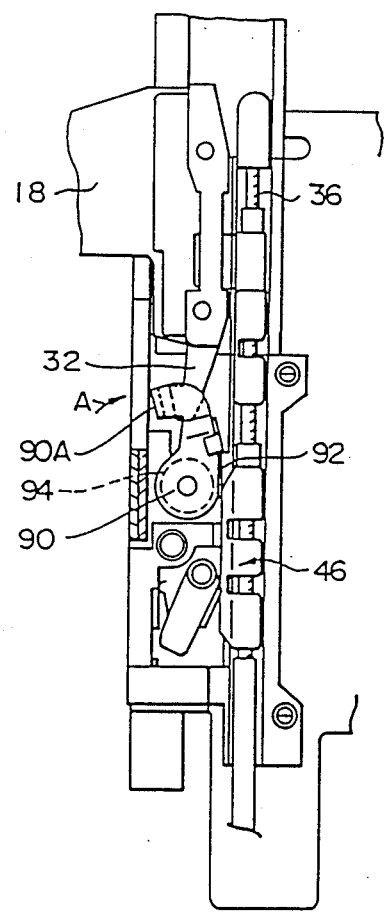
Figure 7:
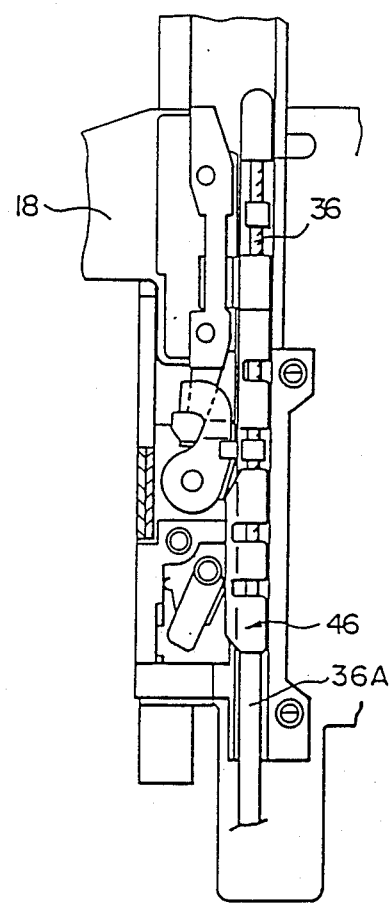
FIGS. 7 to 10 are sectional views corresponding to FIG. 1 and illustrating each condition of the operations to release the webbing from around the body of the occupant.

When, as shown in FIG. 6, the hook 32 of the slider 18 has reached the position where it is engaged with the connecting section 90A of the lock plate 90, the release piece 46 is on the point of leaving the lock plate actuator 92.

When the wire cable 36 has further moved from the position shown in FIG. 6, the hook 32 of the slider 18 collides with the rubber damper 94, thereby stopping the movement of the wire cable 36. Simultaneously with this, the release piece 46 removes from the lock actuator 92, so that the lock plate 90 swings in the A-direction, urged by the return spring 98. This causes the connecting section 90A of the lock plate 90 to be locked by the hook 32 of the slider 18, thereby restraining the movement of the slider 18. This condition corresponds to the one shown in FIG. 1.

Since the rubber damper 94 with which the hook 32 of the slider 18 collides transmits part of the impact remaining unabsorbed to the housing 57 through the shaft 74, the impact is prevented from being directly transmitted to the switch components.

When the occupant 28 opens the door of the vehicle in order to get out, the driving device 30 is operated in the direction reverse to the one describe above, the wire cable 36 being moved toward the front side of the vehicle inner space.

The slider 18 and the release piece 46 are held in the condition shown in FIG. 1 for quite a short time after the wire cable 36 starts to move. However, when the outer covering 36A of the wire cable 36 abuts against the release piece 46, the release piece 46 starts its movement.

Figure 8:
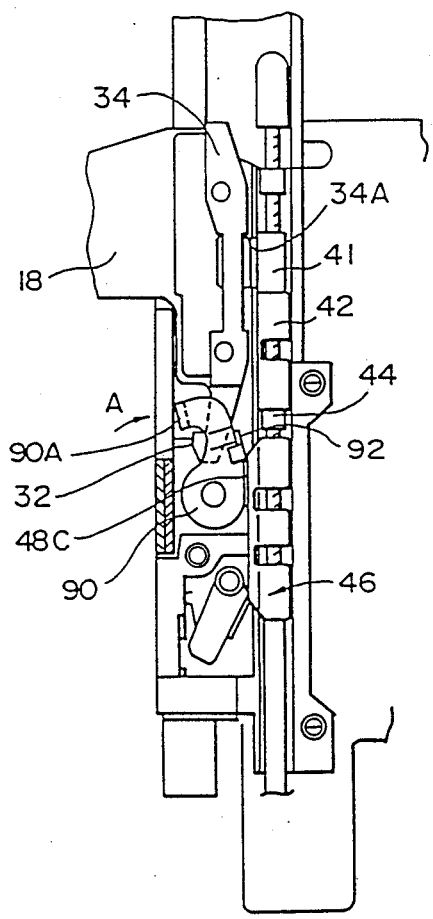

When, as shown in FIG. 8, the horizontal surface 48C applies pressure to the lock plate actuator 92, the lock plate 90 rotates in the anti-A direction against the resilient force of the return spring 98, thereby releasing the locking engagement of the connecting section 90A with the hook 32 of the slider 18. At the same time, the third fixed piece 44 applies pressure to the slide piece 41 through the movable piece 42. The slide piece 41 then moves and starts to abut against the front wall 34A of the head 34, thereby moving the slider 18.

Figure 9:
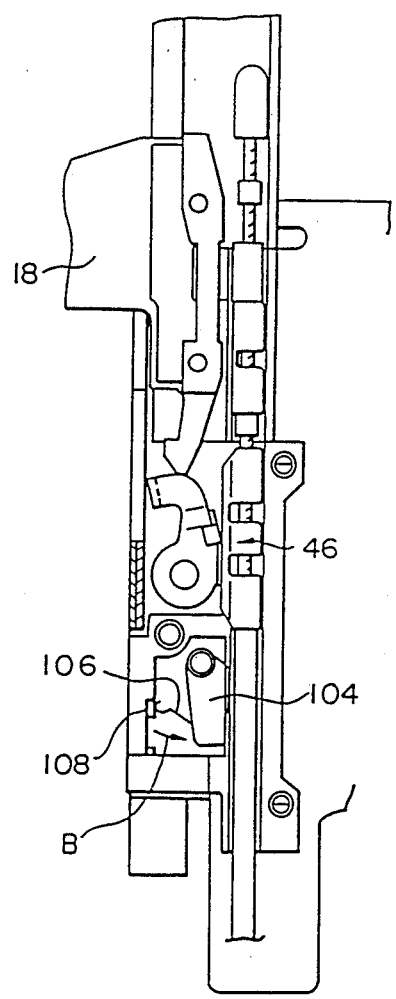

When, as shown in FIG. 9, the release piece 46 is separated from the switching actuator 104, the switching actuator 104 swing in the B-direction, urged by the contact 106, which is pressed against the terminal 108.

Figure 10:
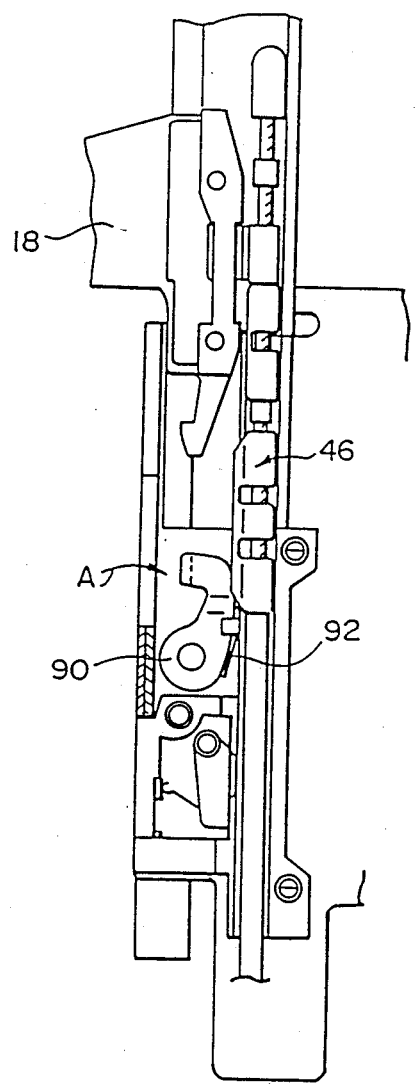

As shown in FIG. 10, separation of the release piece 46 from the lock plate actuator 92 results in the lock plate 90 rotating in the A-direction, urged by the return spring 98. When the slider 18 reaches the end of its movement which is on the front side of the room of the vehicle, a switch (not shown) is driven, thereby stopping the operation of the driving device 30. This causes the fastening of the webbing 20 around the body of the occupant 28 to be released, allowing the occupant 28 to get out of the vehicle.

What is claimed is:

1. An automatic seat belt device for automatically fastening a webbing around a body of an occupant on a vehicle seat comprising:
    a slider connected to one end of said webbing;
    a guide rail for slidably supporting and guiding said slider to forward and rearward directions with respect to a room in a vehicle;
    a driving means for driving said slider by means of an elongate member;
    a slider stopping mechanism for causing said driving means for stop at a near end portion of movement of said slider in said room of said vehicle including a switch disposed at said near end portion of movement so as to open and close a circuit for operating said driving means, said switch having a stationary contact and a movable contact supported by a pivotable actuator member;
    a slider lock mechanism for retaining said slider in locking condition at an end portion of movement thereof in said room of said vehicle; and
    a control member supported on said elongate member and being movable therewith for pivoting said pivotable actuator member and said movable contact between an active and an inactive position wherein said movable contact is in contact with said stationary contact and out of contact with said stationary contact respectively, and for controlling said slider lock mechanism.

2. An automatic seat belt drive as claimed in claim 1, wherein said control member has a supporting section supported by said elongate member and an operating section projected from said supporting section for operating said slider stopping mechanism and said slider lock mechanism.

3. An automatic seat belt device as claimed in claim 2, wherein said supporting section is formed by a cylindrical body penetrated by said elongate member, and said operating section is formed by a plate-like member provided on an outer peripheral portion of said cylindrical body and outwardly extends in an axial direction of said cylindrical body.

4. An automatic seat belt device as claimed in claim 3, wherein said cylindrical body is comprised by a plurality of cylindrical members, and said cylindrical members are connected by said plate-like member.

5. An automatic seat belt device as claimed in claim 4, wherein said plate-like member has a trapezoid configuration, having leading and trailing ends thereof oppositely tapered in said axial direction.

6. An automatic seat belt device as claimed in claim 2, wherein said slider lock mechanism includes a hook portion extending from said slider toward said near end portion of movement, and a lock member which engages with said hook portion at said end portion of movement for preventing the slider from moving away from said end portion of movement.

7. An automatic seat belt device as claimed in claim 6, wherein said lock member has a lock plate which pivots in a direction away from said hook portion when said lock member is contacted by said operating section of said control member, and pivots in a direction toward said hook portion for engagement with said hook portion when said operating section is separated from the lock member.

8. An automatic seat belt device as claimed in claim 7, wherein said control member is supported by said elongate member at an end portion of said elongated member so that said operating section is separated from said lock member after said operating section has temporarily contacted said lock member.

9. An automatic seat belt device as claimed in claim 1, wherein said actuator member abuts against and is pivoted by the operating section of said control member when said control member reaches said near end portion of movement in a first direction so that said movable contact is separated from said stationary contact.

10. An automatic seat belt device as claimed in claim 9, wherein said movable contact is made for an electrically conductive, resilient metal member, and said movable contact is in contact with said stationary contact when said control member is away from said near end portion of movement, with said resilient metal member urging said actuator member in a second direction opposite to said first direction.

11. An automatic seat belt device for automatically fastening a webbing around a body of an occupant on a vehicle seat comprising:
    a slider connected to one end of said webbing;
    a guide rail for slidably supporting and guiding said slider between a forward and a rearward limit of movement with respect to a room in a vehicle;
    a driving means for driving said slider by means of an elongate member;
    a slider stopping means for disengaging said driving means before said slider reaches said limit of movement in said rearward direction in said room of said vehicle;
    a slider lock means for retaining said slider in a locked condition at said limit of movement in said rearward direction in said room of said vehicle; and
    a control means supported on said elongate member and being movable therewith for controlling both operation of said slider stopping means and said slider lock means.

12. An automatic seat belt device as claimed in claim 11, wherein said control means has a supporting section supported by said elongate member and an operating section projected from said supporting section for operating said slider stopping means and said slider lock means.

13. An automatic seat belt device as claimed in claim 12, wherein said supporting section is formed by a cylindrical body penetrated by said elongate member, and said operating section is formed by a plate-like member provided on an outer peripheral portion of said cylindrical body and outwardly extends in an axial direction of said cylindrical body.

14. An automatic seat belt device as claimed in claim 13, wherein said cylindrical body is comprised by a plurality of cylindrical members, and said cylindrical members are connected by said plate-like member.

15. An automatic seat belt device as claimed in claim 14, wherein said plate-like member has a trapezoid configuration, having first and second ends thereof oppositely tapered in said axial direction.

16. An automatic seat belt device as claimed in claim 12, wherein said slider stopping means includes a switch disposed before said rearward limit of said movement so as to open and close a circuit for operating said driving means, said switch including a stationary contact and a movable contact which separably contacts said stationary contact, with said mobile contact being separated from said stationary contact before said control means has reached said rearward limit of movement for operating said circuit and discontinuing a driving force exerted by said driving means.

17. An automatic seat belt device as claimed in claim 16, wherein said movable contact is supported by a pivotable actuator member.

18. An automatic seat belt device as claimed in claim 17, wherein said actuator member abuts against the operating section of said control member before said control member reaches said rearward limit of movement to be pivoted in a first direction, to separate said movable contact from said stationary contact.

19. An automatic seat belt device as claimed in claim 18, wherein said movable contact is made from an electrically conductive, resilient metal member, said movable contact being urged into contact with said stationary contact by said resilient metal member when said control member is away from said rearward limit of movement.

20. An automatic seat belt device as claimed in claim 12, wherein said slider lock means includes a hook portion extending from said slider in a direction toward said rearward limit of movement, and a lock member which engages with said hook portion when said rearward limit of movement is reached to prevent said slider from moving away from said rearward limit movement.

21. An automatic seat belt device as claimed in claim 20, wherein said lock member has a lock plate which pivots in a direction away from said hook portion when said lock member is contacted by said operating section of said control member, and pivots in a direction for towards said hook portion when said operating section is separated from the lock member.

22. An automatic seat belt device as claimed in claim 21, wherein said control means is supported by said elongate member so that at said rearward limit of movement said operating section is separated from said lock member after said operating section has temporarily contacted to said lock member.

23. An automatic seat belt device having an elongate guide rail arranged in a longitudinal direction of a room in a vehicle and a slider having secured at one end a webbing and supported by said guide rail and slidably movable in the longitudinal direction of said vehicle, said slider being automatically moved between a forward and a rearward limit of movement in said longitudinal direction of the room in the vehicle by a driving force of a driving means so that the webbing is positioned about a body of an occupant on a vehicle seat, comprising:

a wire cable engaged with said slider at one end thereof and transmitting the driving force of said driving means to said slider and moving said slider between said forward and rearward limits of movement;

a slider stopping means being operated to discontinue said driving force before said slider reaches said rearward limit of movement;

a slider locking means being operated to lock said slider and retain a locking state thereof when said slider reaches said rearward limit of movement; and a control means supported on said wire cable to move in accordance with movement of said wire cable, and operating said slider stopping means to stop said driving means before said rearward limit of movement and operating said slider lock means to lock the slider at said rearward limit of movement.

24. An automatic seat belt device as claimed in claim 23, wherein said control means is comprised by a cylindrical body penetrated and supported by said wire cable and an operating plate section provided on a periphery of said cylindrical body penetrated and supported by said wire cable and an operating plate section provided on a periphery of said cylindrical body and extending in an axial direction of said cylindrical body for operating said slider stopping means and said slider lock means.

25. An automatic seat belt device as claimed in claim 24, wherein said cylindrical body includes a plurality of cylindrical members divided in the axial direction thereof, with said cylindrical members being connected by way of said operating plate section.

26. An automatic seat belt device as claimed in claim 25, wherein said operating plate section has a trapezoid configuration having first and second ends thereof oppositely tapered in said axial direction.

27. An automatic seat belt device as claimed in claim 24, wherein said slider stopping means includes a switch disposed before said rearward limit of said movement so as to open and close a circuit for operating said driving means, said switch including a stationary contact and a movable contact which separably contacts said stationary contact, with said movable contact being separated from said stationary contact before said control means has reached said rearward limit of movement for opening said circuit and discontinuing said driving force.

28. An automatic seat belt drive as claimed in claim 27, wherein said movable contact is supported by a pivotable actuator member.

29. An automatic seat belt device as claimed in claim 28, wherein said actuator member is contacted by said operating plate section before said control member reaches said rearward limit of movement and is pivoted in a first direction to separate said movable contact from said stationary contact.

30. An automatic seat belt device as claimed in claim 29, wherein said movable contact is made from an electrically conductive, resilient metal member, said movable contact being urged into contact with said stationary contact by said resilient metal member when said control member is away from said rearward limit of movement.

* * * * *